United States Patent [19]

Drutel et al.

[11] Patent Number: 5,582,152
[45] Date of Patent: Dec. 10, 1996

[54] PROCESS AND DEVICE FOR DETERMINING THE PARAMETERS OF THE FUEL INJECTORS OF AN INTERNAL COMBUSTION ENGINE

[75] Inventors: Yves Drutel; Denis Ranc, both of Saint-Priest; Marc Miettaux, Decines, all of France

[73] Assignee: Renault Vehicules Industriels, Lyons, France

[21] Appl. No.: 469,458

[22] Filed: Jun. 6, 1995

[30] Foreign Application Priority Data

Jun. 6, 1994 [FR] France ................... 94 06873

[51] Int. Cl.[6] ................... F02D 41/14
[52] U.S. Cl. ................... 123/436; 73/119 A; 123/478
[58] Field of Search ................... 123/436, 478; 73/119 A

[56] References Cited

U.S. PATENT DOCUMENTS

| | | | |
|---|---|---|---|
| 4,561,397 | 12/1985 | Tsukamoto et al. | 123/357 |
| 4,667,634 | 5/1987 | Matsumura et al. | 123/357 |
| 4,697,561 | 10/1987 | Citron | 123/436 X |
| 4,779,595 | 10/1988 | Fujimori et al. | 123/436 |
| 4,903,669 | 2/1990 | Groff et al. | 123/478 |
| 5,070,836 | 12/1991 | Wahl et al. | 123/299 |
| 5,086,741 | 2/1992 | Nakamura et al. | 123/436 X |
| 5,117,793 | 6/1992 | Taue | 123/436 |
| 5,293,853 | 3/1994 | Berger et al. | 123/357 |
| 5,385,129 | 1/1995 | Eyberg | 123/436 |
| 5,445,128 | 8/1995 | Letang et al. | 123/436 |

FOREIGN PATENT DOCUMENTS 2272785  5/1994  United Kingdom.

Primary Examiner—Tony M. Argenbright
Attorney, Agent, or Firm—Oblon, Spivak, McClelland, Maier & Neustadt, P.C.

[57] ABSTRACT

Specific parameters of each of the injectors of the injection device of a combustion engine, especially a device with pre-injection with electronic control of a diesel engine, are determined. The curve of the instantaneous speed difference (DVi) of the engine shaft between the time of transition to the combustion top dead center point of the cylinder in question and a subsequent time preceding the transition to the combustion top dead center point of the following cylinder is established as a function of the value of the parameter to be determined, the other parameters of functioning being kept constant. The optimum value of the parameter is determined which corresponds to an extremum of the curve.

10 Claims, 3 Drawing Sheets

PROCESS AND DEVICE FOR DETERMINING THE PARAMETERS OF THE FUEL INJECTORS OF AN INTERNAL COMBUSTION ENGINE

BACKGROUND OF THE INVENTION

1. Field of the Invention

This invention pertains to internal combustion engines, particularly those which are used for passenger vehicles. The invention pertains in particular to diesel engines with pre-injection or pilot injection, that is to say, engines in which fuel injection is conducted two times, which includes separate pre-injection and main injection. The invention pertains more particularly to electronic injection systems which include a processor which controls the injector control valves as a function of a program which takes into consideration the different operating parameters of the engine, such as rotational speed, injection pressure, position of the cam shaft and injection pressure.

2. Description of the Related Art

It is desirable that the fuel injection program also take into consideration the specific characteristics of each of the injectors in order to maximally balance operation of the engine and to optimize the combustion noise and monitor the exhaust gas emissions. To accomplish this, it is necessary to be able to guarantee perfect reproducibility from one cylinder to another, and it is therefore necessary to know the specific parameters of each injector, that is to say, the electro-hydraulic characteristics thereof.

SUMMARY OF THE INVENTION

This invention has as an object a process for determining specific parameters of each of the injectors of a fuel injection unit with electronic control.

The invention also has as an object a device for implementing the aforementioned process.

According to a characteristic of the invention, the above and other objects are achieved by a process including the steps of establishing a curve of an instantaneous speed difference (DVi) of a crank shaft of the engine between a combustion top dead center point of a cylinder in question and a subsequent moment which is prior to a combustion top dead center point of a next subsequent cylinder to undergo combustion, the other functioning parameters being kept constant, and determining an optimum value of said parameter with reference to an extreme point of said curve. This difference of instantaneous speed is representative of the gas pressure in the cylinder, a pressure which cannot be measured directly, but whose value is greatly dependent on the quantity of injected fuel.

According to another characteristic of the invention, one determines in advance, for each injector, the duration of electronic control which will guarantee an identical fuel flow volume with constant injection pressure. This allows one to achieve equilibrium of the station to station fuel flow rates of the injection system.

In order to determine the hydraulic response time of each injector, one performs two separate injections—a pre-injection and a main injection—during a constant time interval. The pre-injection control duration is varied, while the total interval of the two durations is maintained constant. One then determines the value of the pre-injection control duration which corresponds to a transition in the slope of the instantaneous speed difference curve.

In order to determine the minimum time interval between the two injections of each injector, one applies two injections of predetermined control durations, one varies the time interval between the two injections, and one determines the time interval corresponding to the peak of the instantaneous speed difference curve.

Preferably, the instantaneous speed difference is measured at a subsequent time which is shifted by half the rotational angle separating the top dead center points for combustion of the cylinder in question and the following cylinder. In this manner one will obtain a maximum value of the instantaneous speed difference.

According to another characteristic of the invention, the measurements are made at idling conditions, the engine having no load. This allows one to have minimum inertia and to obtain considerable instantaneous speed differences.

According to yet another characteristic of the invention, the measurements are conducted with injection advance allowing combustion to begin at the top dead center point.

According to a first embodiment of an apparatus for carrying out the aforementioned process, a program is integrated in an injector electronic control module. This allows one to determine the specific parameters of the injectors at any moment, in particular following the replacement of one or several injectors, or to conduct control tests in case the engine is functioning poorly.

According to another embodiment, the process according to the invention is implemented in the form of a program integrated in a specific module which can be connected to the electronic control module of the injectors. Such a specific module can be placed at the end of an assembly line for calibrating the engine or in the after-sale market for replacement of injectors.

BRIEF DESCRIPTION OF THE DRAWINGS

Other characteristics and advantages of the invention will appear from reading the detailed description which follows for an understanding of which one should refer to the attached drawings in which.

DESCRIPTION OF THE PREFERRED EMBODIMENTS

The invention applies in particular to electronic control systems of injectors of a diesel engine with pilot injection in which the injection is accomplished at two distinct times, which are a pre-injection of short duration and a main injection.

Figure 1:
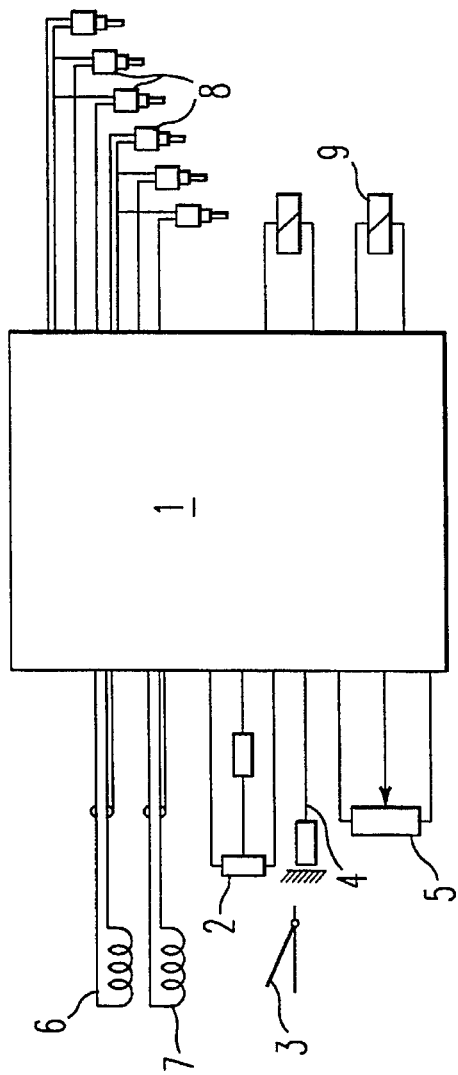
FIG. 1 schematically shows an electronic control device for injectors of a diesel engine.

FIG. 1 schematically represents such a system. It includes a processor 1 which receives data from a sensor 2 which is actuated by the accelerator pedal 3, from a contact 4 which imposes idle operation, from an injection pressure sensor 5, from a rotational speed sensor of the engine crank shaft 6, and from a sensor of the angular position of a cam shaft 7.

This processor controls the electronic valves of fuel injectors 8 of a diesel engine. More particularly, it controls injection pressure by means of, by way of example, electronic injection control valves 9. This control is achieved by a program which takes into consideration the operational parameters supplied by sensors 2 and 4 to 7. This program includes a map which includes previously determined curves of engine operation, for example, curves of the flow rate of injectors as a function of the pressure and duration of the electronic valve opening control of said injectors.

In order to balance and optimize operation of the engine, it is desirable to introduce into this map the specific characteristics of each of the injectors, which can have different characteristics, which might introduce variations in operation of the engine. The flow rate of injected fuel is directly dependent on the electric control duration of the injector. The control computer allows one to determine very precise and very efficient control durations. On the other hand, the unique hydraulic characteristics of each of the injectors do not allow one to control the low flow rates very faithfully. In particular, in a present pilot injection system which allows one to control pre-injection and main injection separated by a very short time interval, it becomes very difficult to obtain homogeneous behavior for each cylinder.

These small control durations allow one to obtain the best results in the face of standardized requirements with regard to exhaust gas and acoustic emissions.

The invention provides for determining characteristic parameters of each of the injectors in order to complete the mapping of the program and to harmonize functioning of the different cylinders.

Figure 2:
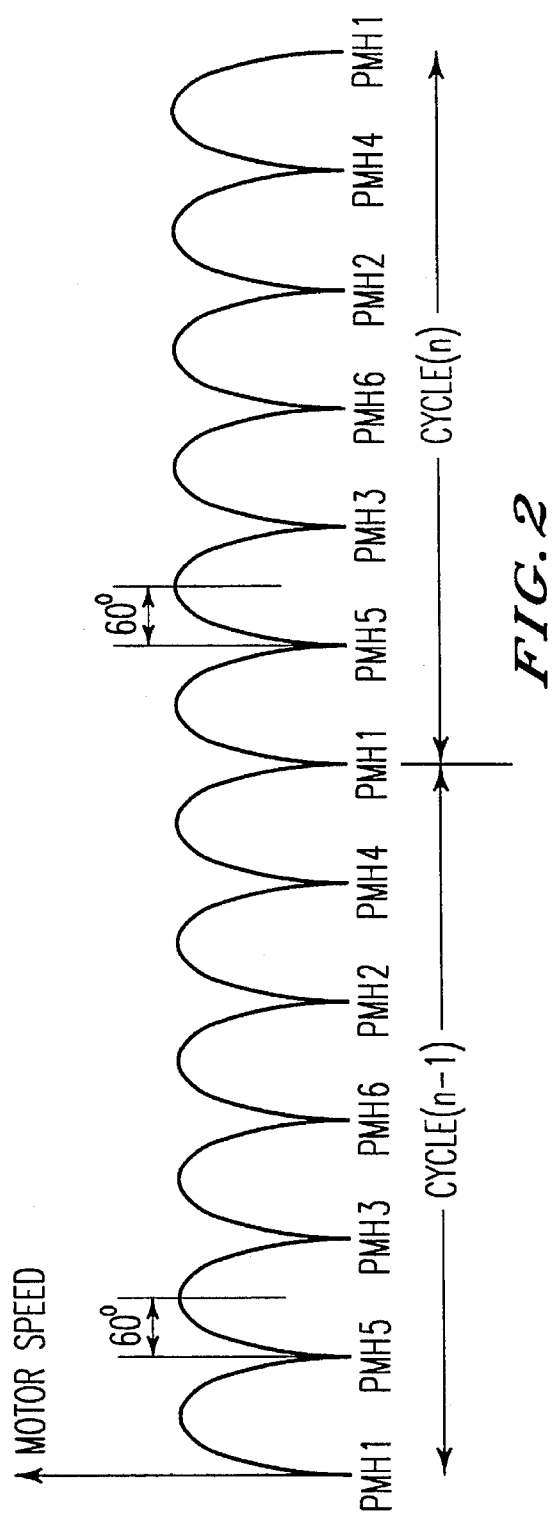
FIG. 2 is a curve which shows the speed variation of an in-line six-cylinder balanced engine.

FIG. 2 shows speed variations of an in-line six-cylinder engine which is perfectly in balance. There is an arc of positive variation of speed between two successive top dead center points of combustion (PMH1, PMH2). In the case under consideration, the length of an arc corresponds to a rotation of 120° of the engine crank shaft.

For a speed of 1000 revolutions per minute, the height of this arc, that is to say, the maximum variation of speed is, for example, 30 revolutions per minute. This maximum variation is obtained at a moment corresponding to a rotation of 60° after the top dead center point of cylinder combustion that is being considered, that is to say, half of the time which separates two successive injections. (In the case of a four cylinder engine, the speed will be a maximum at 90° after the top dead center point of combustion, and at 45° for a V-8 engine.)

In a first step one produces equilibrium of station-to-station flow rates of the injection system while the engine operates at no-load in idle mode, injection advance is controlled in order to obtain the beginning of combustion at the top dead center point, and injection is maintained constant. To accomplish this, one applies simple injection of the same control duration $TQ_i$ for all injectors (i) and measures the instantaneous speed difference ($DV_i$) between the combustion dead center point and a moment shifted by 60° for each cylinder. That is, one measures, for each of the top dead center points PMH(i) in a cycle of FIG. 2, a speed difference between that point and the next subsequent peak speed. One also measures the average ($MDV_i$) of the instantaneous speed differences of all cylinders for one cycle (n−1, n, etc.) of the engine.

One then makes the following correction to the control duration of each injector (i):

$$DTQ_i=(DV_i-MDV_i)$$

where k is a constant. The new corrected control duration for each injector then is:

$$TQ_i \text{ corrected}=TQ_i-DTQ_i=TQ_i-k\ (DV_i-MDV_i).$$

Figure 3:
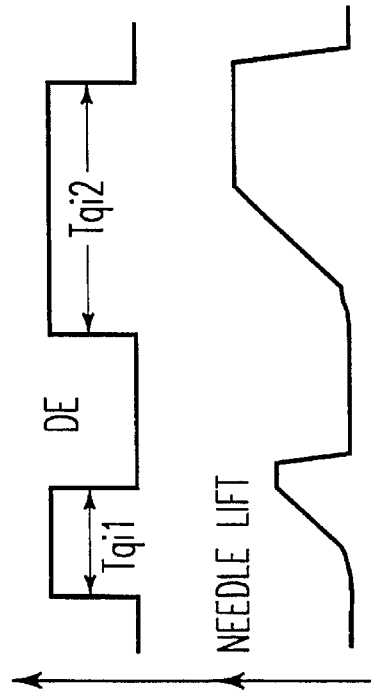
FIG. 3 shows, by way of example, the flow rate curves as a function of the opening control duration for three injectors.

By knowing the correction for each injector, one can determine a flow rate curve for each injector (i) (FIG. 3). By plotting the fuel flow rate curves as a function of the control duration for each cylinder, one can establish a constant fuel volume ($Q_{i1}$) for each injector as is illustrated in FIG. 3.

In a second aspect of the invention, one maintains the same measurement conditions, but one carries out a pilot injection with a pre-injection having a duration $TQ_{i1}$ and a main duration of duration $TQ_{i2}$ which are separated by a predetermined delay time DE. One can vary the duration of pre-injection $TQ_{i1}$ by maintaining the total injection duration $TQ_{i1}+TQ_{i2}$ constant, and one can control the curve of the instantaneous speed difference as a function of the duration of pre-injection $TQ_{i1}$.

Figure 7:
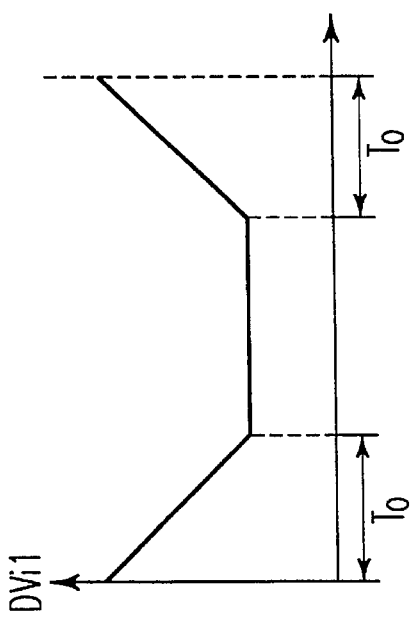

The characteristics of the fuel injectors which can cause differences in the flow rate from one to the next include the response time of the injector to an opening signal. One can measure this hydraulic response time by varying an injection parameter and determining when the resulting curve for speed difference $DV_i$ reaches a transition or break point to a plateau (FIG. 7). The point of the slope interruption of this curve allows one to determine the opening time of the injector, starting from which said injector begins to flow.

Figure 4:
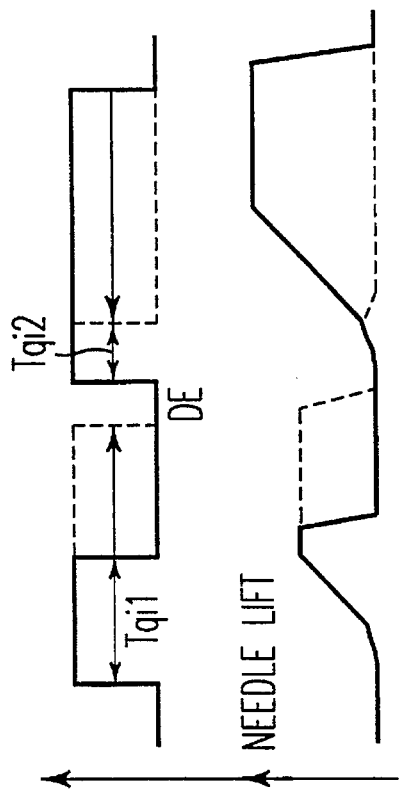
FIGS. 4 to 7 illustrate determination of the hydraulic response time of the injectors.
Figure 5:
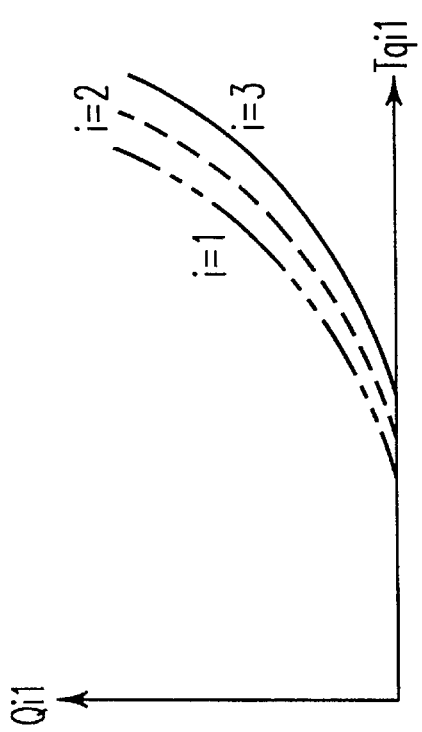
Figure 6:
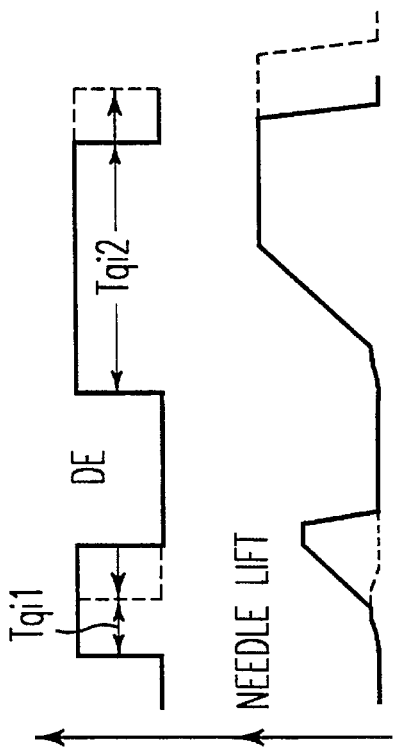

FIGS. 4 to 6 each represent the control duration and injector needle lifting, which correspond to three values of $TQ_{i1}$. The curves of FIG. 5 correspond to the value of $TQ_{i1}$ for which injection stops, that is to say, where the fully open part of the curve of FIG. 7 has the minimum duration of pilot injection which allows one to obtain the smallest quantifiable flow rate. This value is the abscissa at the origin of the flow rate curve as a function of the duration for the cylinder in question; it is used to provide an identification map of the injector. If one knows the point of this map for idle mode and the point with zero flow rate, it is possible to provide this mapping zone linearly. This procedure is carried out for each injector in order to determine a particular map for each station (injector), which will guarantee identical behavior in pilot injection.

Figure 8:
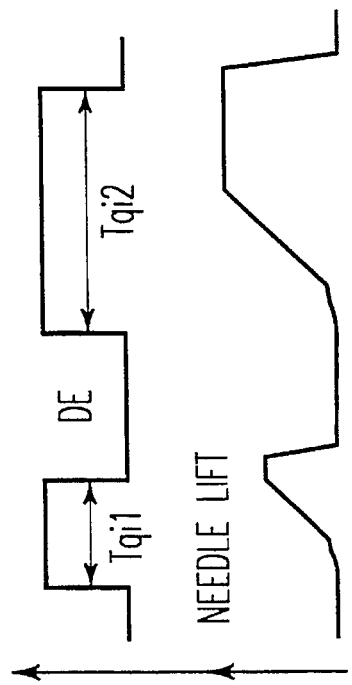
FIGS. 8 to 10 illustrate the determination of the minimum time interval between pre-injection and main injection.
Figure 9:
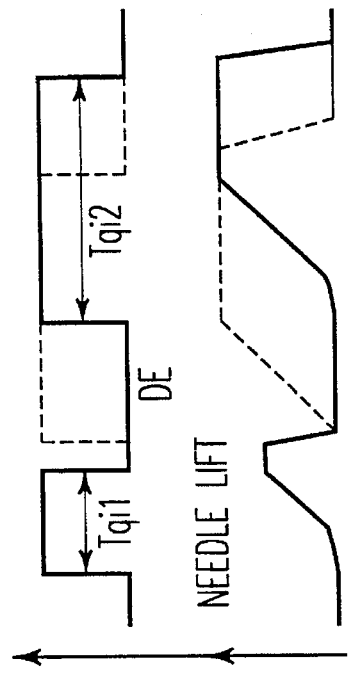

In a third aspect of the invention, one preserves the same general measurement conditions, but carries out the double injection while maintaining durations $TQ_{i1}$ and $TQ_{i2}$ constant. One instead varies the delay DE which separates the two injections by constantly raising the curve of the instantaneous speed difference; the curves of FIGS. 8 and 9 correspond to two different values of the delay DE.

Figure 10:
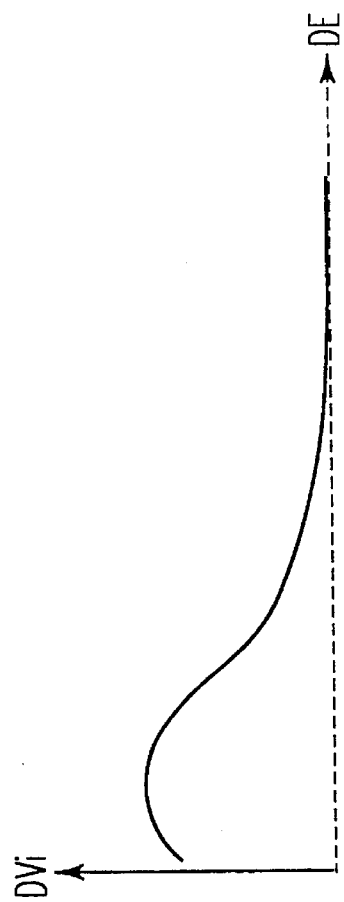

When one arrives at a minimum delay time which no longer allows the injector to close before the second control, the instantaneous speed difference passes through a peak, as one can see on the curve of FIG. 10. The resulting flow rate becomes greater than the requested flow rate because the injector behaves as if it had received only a single command. One thereby determines the minimum acceptable delay time for an injector; it is directly connected to the closing time of the injector.

The identification of this characteristic is very important because it will allow one to optimize and faithfully guarantee the combustion noise for each injector.

This procedure is carried out for each cylinder. The determination of this characteristic allows one to guarantee for each cylinder the same behavior during injection, even if the characteristics of the injectors are not identical. It is therefore possible to guarantee for each cylinder the same rate of introduction and identical behavior in combustion.

The process which has just been described is preferably carried out in the form of a computer program which can be integrated in the control processor of the injectors and remain permanently in the engine. It can also be integrated with a specific module which can be connected to the processor. In both cases the program is executed by the processor by using the sensors and the actuators which are permanently on the engine. The injection pressure sensor 5 and the control electronic valve 9 of the injection pressure are used to regulate injection pressure at a constant value. The idle contact 4 is closed in order to impose functioning of the engine in idle mode.

The sensor of angular position of cam shaft 7 allows one to identify the cylinder for which one is taking a measurement. The speed sensor of engine shaft 6 allows one to mark the transition to the combustion top dead center point and the transition at 60° following this transition to the top dead center point, and it provides the value of the instantaneous speed difference between these two transitions. The curves of the second and third steps are obtained by affecting the opening durations of the electronic valves of the injectors 8. The values obtained for the parameters of each injector are recorded in the map of processor 1. In the case of intervention at the after-sales stage, the values obtained will replace the preceding values.

The process according to the invention can be implemented at the time of the end of assembly line inspection for adjusting the engine. It can also be used to carry out tests in case of the engine functioning poorly during after-sales servicing. It can also be used for a new adjustment in the case of changing one or several injectors.

What is claimed:

1. A process for determining a specific parameter of each fuel injector in an injector device of a multi-cylinder diesel engine having pre-injection with electronic control, comprising the steps of:

establishing a curve of an instantaneous speed difference (DVi) of a crank shaft of the engine between a combustion top dead center point of a cylinder in question and a subsequent moment which is prior to a combustion top dead center point of a next subsequent cylinder to undergo combustion, the other functioning parameters being kept constant; and determining an optimum value of said parameter with reference to an extreme point of said curve.

2. Process according to claim 1, wherein said determining step comprises determines, for each injector, a duration of electronic control which will guarantee an identical fuel flow volume, at a constant injection pressure.

3. Process according to claim 1, wherein said step of establishing a curve comprises applying a single injection of a duration (TQi) for each injector, and wherein said determining step comprises measuring said instantaneous speed difference (DVi) for each cylinder, calculating an average of said instantaneous speed differences (MDVi), and determining a corrected control duration for each cylinder for the predetermined flow rate by the formula:

$$TQi \text{ corrected} = TQi - k\ (DVi - MDVi).$$

4. Process according to claim 1 including the step of determining a hydraulic response time of each of the injectors, comprising:

applying a pre-injection and a main injection over a time interval;

varying a control duration of pre-injection while maintaining the time interval constant; and determining a value of the control duration of pre-injection which corresponds to a break in the slope of the curve of the instantaneous speed difference (DVi1).

5. Process according to claim 1 including the step of determining a minimum time interval between a pre-injection and a main injection of each injector, comprising the steps of:

applying a pre-injection and a main injection of fixed control durations;

varying the time interval between the two injections; and determining a time interval which corresponds to a peak of the instantaneous speed difference curve (DVi).

6. Process according to claim 1 wherein the subsequent moment is shifted by half the angle of rotation which separates the combustion top dead center point of the cylinder in question and of the following cylinder.

7. Process according to claim 1 wherein the establishing step is carried out in idle mode, the motor being at no load.

8. Process according to claim 1 wherein the establishing step is carried out with an injection advance allowing a beginning of combustion at the top dead center point.

9. A device determining a specific parameter of each fuel injector in an injector device of a multi-cylinder diesel engine having pre-injection with an electronic control, which comprises:

a mechanism establishing a curve of an instantaneous speed difference (DVi) of a crank shaft of the engine between a combustion top dead center point of a cylinder in question and a subsequent moment which is prior to a combustion top dead center point of a next subsequent cylinder to undergo combustion, the other functioning parameters being kept constant, and determining an optimum value of said parameter with reference to an extreme point of said curve, said mechanism including a program which is integrated in an electronic control module of the injectors.

10. A device determining a specific parameter of each fuel injector in an injector device of a multi-cylinder diesel engine having pre-injection with an electronic control module, which comprises:

a mechanism establishing a curve of an instantaneous speed difference (DVi) of a crank shaft of the engine between a combustion top dead center point of a cylinder in question and a subsequent moment which is prior to a combustion top dead center point of a next subsequent cylinder to undergo combustion, the other functioning parameters being kept constant, and determining an optimum value of said parameter with reference to an extreme point of said curve, the mechanism including a program integrated in a specific module which is connected to the electronic control module of the injectors.

* * * * *